(12) United States Patent
Challener et al.

(10) Patent No.: US 8,566,600 B2
(45) Date of Patent: Oct. 22, 2013

(54) PASSWORD MANAGEMENT OUTSIDE OF A BIOS

(75) Inventors: David C. Challener, Raleigh, NC (US); Howard Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1170 days.

(21) Appl. No.: 12/040,535

(22) Filed: Feb. 29, 2008

(65) Prior Publication Data

US 2009/0222909 A1     Sep. 3, 2009

(51) Int. Cl.
*G06F 21/00*     (2013.01)

(52) U.S. Cl.
USPC .......................................... 713/182; 713/192

(58) Field of Classification Search
USPC .................... 713/1, 2, 182, 192, 194
See application file for complete search history.

(56) References Cited

U.S. PATENT DOCUMENTS

| 5,778,199 A * | 7/1998 | Wanner et al. ................. 710/107 |
| 2006/0064752 A1 * | 3/2006 | Wang et al. ..................... 726/19 |
| 2008/0130893 A1 * | 6/2008 | Ibrahim et al. ................ 380/277 |

* cited by examiner

*Primary Examiner* — Edward Zee
(74) *Attorney, Agent, or Firm* — Ference & Associates LLC

(57) ABSTRACT

In accordance with at least one presently preferred embodiment of the present invention, there is broadly contemplated herein the managing of a POP not solely in the BIOS but at least partly in a more secure location. In accordance with a particularly preferred embodiment of the present invention, this location could be in a NVRAM (non-volatile random access memory) inside a TPM (trusted platform module). Most preferably, this location will contain code that the BIOS preferably will need to access and employ in order to complete the booting of the system.

15 Claims, 3 Drawing Sheets

PASSWORD MANAGEMENT OUTSIDE OF A BIOS

FIELD OF THE INVENTION

The present invention relates generally to password management in a computer system.

BACKGROUND OF THE INVENTION

As is well known, passwords have long been employed by way of protecting computer systems from unauthorized access. Generally, computers have a type of firmware known as a basic input/output system (BIOS) which can provide different types of password protection. Normally, a "hard disk password" (HDP) controls access to the hard disk drives or other storage devices of a computer, while a "power-on password" (POP) controls access to the loading of the operating system.

Problems may be encountered in connection with such an arrangement, however. Particularly, to the extent that a POP can be read out of a BIOS memory, this may present a significant security issue when the POP (as often is the case among users) is the same as the HDP. Since possession of a HDP can permit an unauthorized user to freely access hard drive contents, the resultant security breach could be enormous, and detrimental to the legitimate user or organization in question. Accordingly, a highly compelling need has been recognized in connection with obviating such a security breach.

SUMMARY OF THE INVENTION

In accordance with at least one presently preferred embodiment of the present invention, there is broadly contemplated herein the managing of a POP not solely in the BIOS but at least partly in a more secure location. In accordance with a particularly preferred embodiment of the present invention, this location could be in a NVRAM (non-volatile random access memory) inside a TPM (trusted platform module). Most preferably, this location will contain code that the BIOS preferably will need to access and employ in order to complete the booting of the system.

Generally, in accordance with at least one presently preferred embodiment of the present invention, a system BIOS will begin booting and will request from the user the POP. This will preferably be employed to unlock and read a section of NVRAM in the TPM. If this is unsuccessful, and an error message appears, the user preferably will be allowed to retry the POP entry. If successful, the return value will preferably be code that the BIOS may access and employ in order to continue running. This code could include the HDP, which in accordance with an embodiment of the present invention the user would not necessarily need to remember.

In summary, one aspect of the invention provides a method comprising the steps of: receiving a password input at a BIOS; and authenticating the password input at a second location, the second location being different from the BIOS; said authenticating comprising transmitting the received password input together with a supplementary component to the second location for authentication.

Another aspect of the invention provides a system comprising: a main memory; a BIOS which acts to receive a password input; an authenticator which authenticates the password input; said authenticator being located differently from the BIOS; said BIOS acting to transmit the received password input together with a supplementary component to the second location for authentication.

Furthermore, an additional aspect of the invention provides a program storage device readable by machine, tangibly embodying a program of instructions executable by the machine to perform a method comprising the steps of: receiving a password input at a BIOS; and authenticating the password input at a second location, the second location being different from the BIOS; said authenticating comprising transmitting the received password input together with a supplementary component to the second location for authentication.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
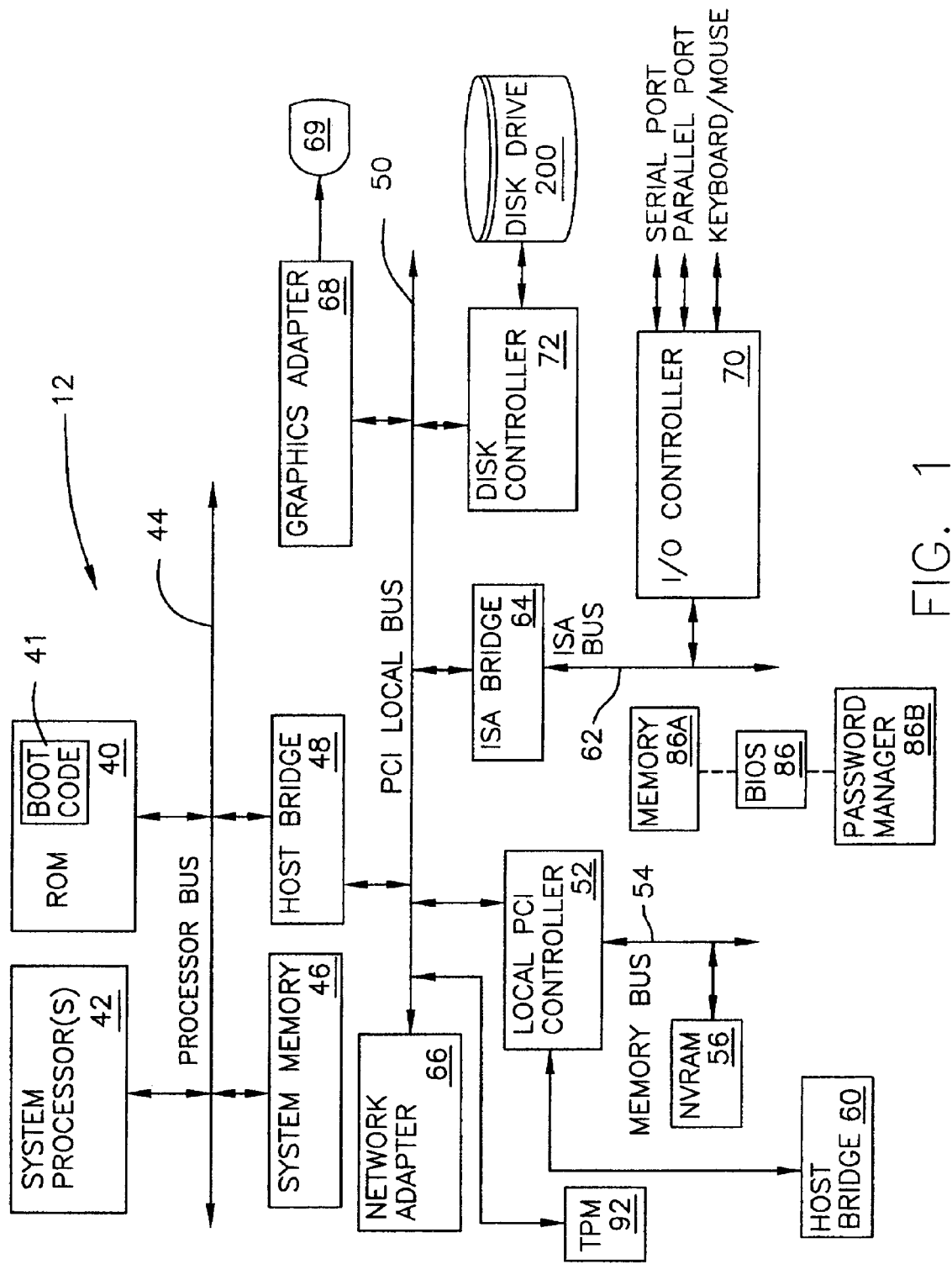
FIG. 1 schematically illustrates a computer system with added components.
Figure 2:
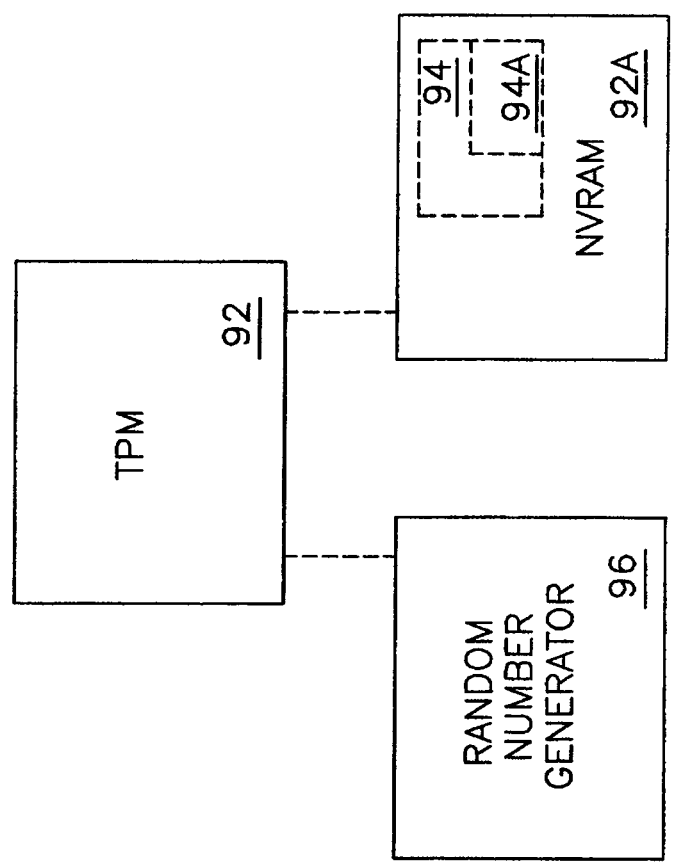
FIG. 2 schematically illustrates a TPM and components.
Figure 3:
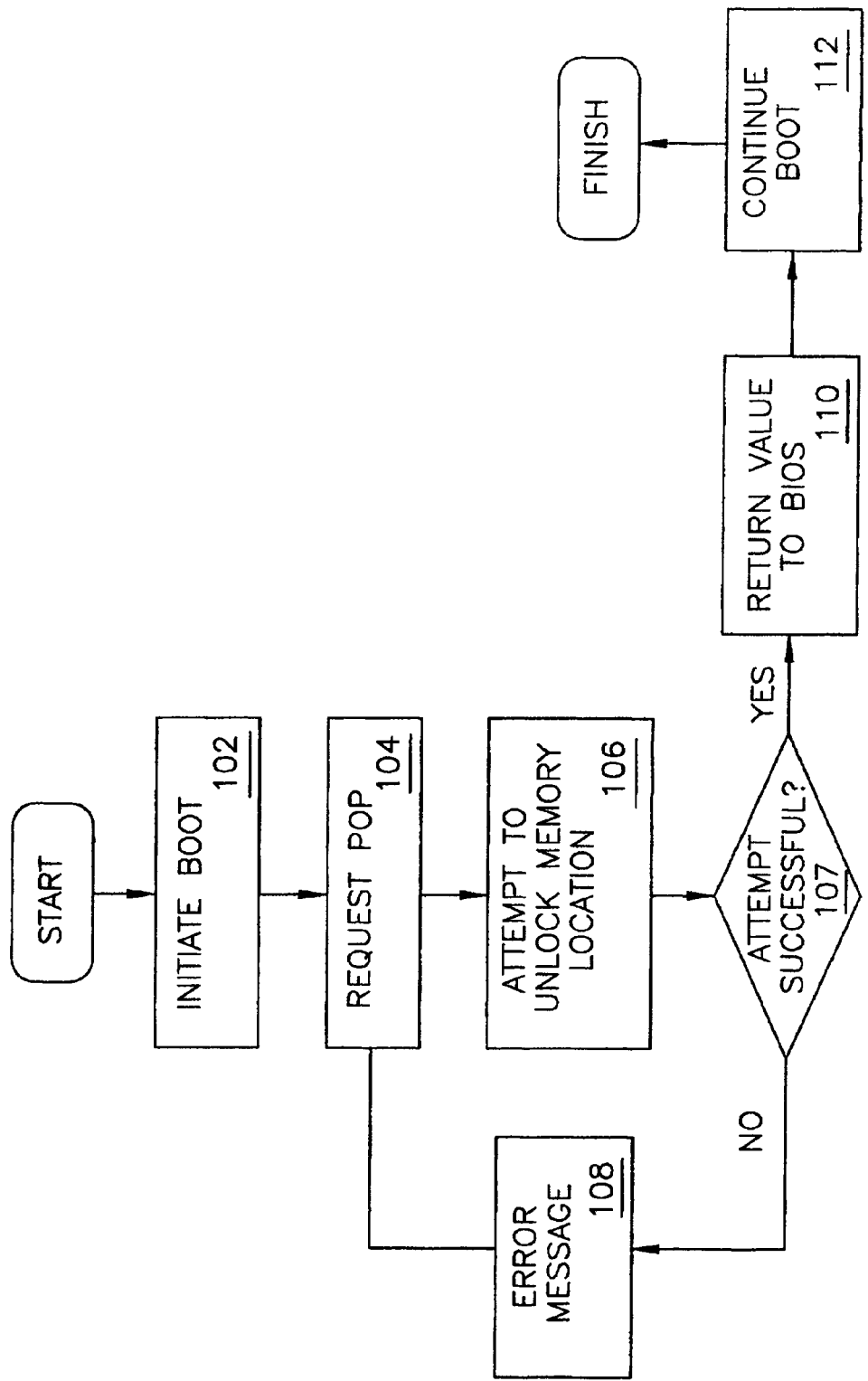
FIG. 3 schematically illustrates a process flow for authenticating a POP.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Indicated at 86 is a BIOS (basic input/output system) whose functioning, in accordance with at least one presently preferred embodiment of the present invention, will be better understood from further discussion herebelow.

As is known conventionally, associated with BIOS 86 is a memory 86a and a password manager 86b. Normally, a POP would be contained in the memory 86a, to be managed by manager 86b. For instance, for those computers where a POP is established prior to shipping and/or optionally established by a user, the BIOS will ensure that the user is queried on the POP when the computer is powered on. At the same time, for those computers where a HDP is established prior to shipping and/or optionally established by a user, the BIOS will ensure that the user is queried on the HDP at an appropriate juncture where the hard drive (normally, at 46) when the computer is powered on.

Often, a user will make a POP and HDP one and the same for the sake of convenience. While this provides an advantage of obviating a need to remember multiple passwords for the same system, in practice it also invites a greater risk of security breaches. For instance, if an unauthorized user were to access the POP password in such a situation, then access to the hard drive could be gained easily. This often is not difficult to undertake as the POP is normally exposed in the BIOS 86 and, since the BIOS 86 is not normally locked before booting, the POP can easily be accessed, e.g., via a chip clip.

In accordance with a presently preferred embodiment of the present invention, the POP is not managed solely in the BIOS 86 but at least partly in a more secure location, e.g., in a TPM. A particularly preferred manner of carrying this out will now be described.

As indicated at 92, system 12 may preferably include a TPM. Normally, this is embodied by a highly secure chip or region where nothing can be read out unless a secure authorization process is successfully executed. Details relating to TPM's can be found at the "Trusted Computing Group" website, www.trustedcomputinggroup.org.

As broadly illustrated in schematic form in FIG. 2, TPM 92 includes a NVRAM 92a. Preferably, a predetermined location 94 of NVRAM 92a will contain code 94a that, in a manner now to be described, the BIOS 86 preferably will need to access and employ in order to complete the booting of the system. TPM 92 also preferably includes a random number generator 96 (examples of which are well known to those of ordinary skill in the computer arts) which functions in a manner to be described herebelow.

Accordingly, FIG. 3 provides a flowchart illustrating a process that may be carried out in accordance with a preferred embodiment of the present invention. Reference can also continue to be made to FIGS. 1 and 2. As shown, system BIOS 86 will initiate booting (102) and, per convention, request from the user the POP (104). BIOS 86 then preferably communicates with TPM 92 (106) in a manner (described below) to attempt to unlock location 94 in NVRAM 92a, and to read the contents of 94 (i.e., code 94a). The general test, also to be discussed more fully below, is indicated at 107.

If the aforementioned unlocking is unsuccessful, an error message will preferably appear (108) and the user will be given the opportunity to reenter the POP (104). If on the other hand the correct POP is supplied by the user and the unlocking is indeed successful, then a return value will preferably be provided in the form of code 94a and returned to BIOS 86 (110), which the BIOS then accesses and employs in order to continue the booting process (112). As stated above, code 94a could include the HDP, which the user need not necessarily employ or have a need to remember but which, in any case, can be used at once to unlock the hard drive.

Essentially, any suitable unlocking procedure may be employed that ensures that the BIOS 86 does not "see" the POP. Now to be described is one particularly preferred implementation in accordance with at least one embodiment of the present invention. Referring to step 106, TPM 92 will first effectively receive a command from the BIOS 86 that the user wishes to complete authorization. Preferably, this will essentially be a request from the BIOS 86 to read memory location 94. In response, random number generator 96 will preferably generate a random number and send it back to the BIOS 86. The BIOS will perform a HMAC (Hash Message Authentication Code) procedure on this random number. The HMAC may be configured in accordance with essentially any suitable secure algorithm as known to those of ordinary skill in the computer arts; secure HMAC algorithms as such can be found, for instance, at the National Institute of Standards and Technology website (www.nist.gov). Thereafter, the POP entered by the user and HMAC output will be conveyed back to the TPM together. The TPM 92 then preferably performs an HMAC procedure and determines whether the user's POP entry is in fact a successful match of the true POP as stored in the TPM 92.

This then brings the process to step 107 where, as stated before, a positive match ("Y") will prompt TPM 92 to send a "return value" to BIOS 86 (at 110) or a negative match ("N") will prompt TPM 92 to generate an error message (108). In a preferred embodiment of the present invention, the "return value" provided by the TPM to the BIOS (step 110 in FIG. 3) includes an HDP that has been stored in memory space 94. Alternatively, essentially any other item can be provided as the "return value" which would serve to unlock the hard drive.

It will be appreciated from the foregoing that the BIOS 86 is not so much managing the POP in toto (and as is conventionally known), as compared to merely transmitting keystrokes over to the TPM 92 for handling. TPM 92 thus essentially keeps the BIOS 86 "blind" to the mechanics of the process and to the actual POP itself, to thus optimally protect the system 12 from unauthorized access. Along these lines, the POP may be pre-programmed at any time into the TPM 92 by the user. Once the POP is in the TPM 92, the TPM 92 preferably will never actually pass the POP out (other than in the context of an authentication process as outlined above).

The act of setting aside memory space inside a TPM in accordance with the processes broadly contemplated herein, and for the purposes described, is well within the purview of those of ordinary skill in the art. The TPM website, supra, provides ample information in that regard. Among the TPM routines that can be employed for the purpose are: tpm_nv_WriteValue_auth (to write a POP into memory); tpm_nv_ReadValue_auth (to require authorization to read a value from TPM memory); tpm_nv_DefineSpace (to reserve space in TPM memory).

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
receiving a power-on password input at a BIOS, said power-on password input not being stored in said BIOS;
transmitting said power-on password input to a second location for authentication; and
authenticating the power-on password input at the second location, the second location being different from the BIOS;
transmitting the power-on password input together with a supplementary component to the second location for authentication;
transmitting an authorization request to the second location; and
receiving an output from the second location;
wherein said authenticating further comprises processing the output from the second location to create the supplementary component.

2. The method according to claim 1, wherein said authenticating comprises authenticating the password input at a TPM.

3. The method according to claim 1, wherein said processing comprises performing an HMAC procedure.

4. The method according to claim 3, wherein said authenticating further comprises performing another HMAC procedure at the second location subsequent to transmission of the password input and supplementary component to the second location.

5. The method according to claim 1, wherein said receiving of an output comprises receiving a random number from the second location.

6. The method according to claim 1, further comprising the step of transmitting a return value from the second location to the BIOS responsive to successful authentication of the password input.

7. The method according to claim 6, wherein the return value enables access to a hard drive.

8. A system comprising:
a main memory;
a BIOS configured to receive a power-on password input, said power-on password input not being stored in said BIOS;
an authenticator configured to authenticate the power-on password input, said authenticator being located differently from the BIOS;
said BIOS configured to transmit the power-on password input together with a supplementary component to the second location for authentication;
wherein said BIOS is configured to:
transmit an authorization request to said authenticator; and
receive an output from said authenticator;
wherein said BIOS is further configured to process the output from said authenticator to create the supplementary component.

9. The system according to claim 8, wherein said authenticator comprises a TPM.

10. The system according to claim 8, wherein said BIOS is configured to process the output from said authenticator via performing an HMAC procedure.

11. The system according to claim 10, wherein authenticator is configured to perform another HMAC procedure subsequent to transmission of the password input and supplementary component to said authenticator.

12. The system according to claim 8, wherein the output from said authenticator comprises a random number.

13. The system according to claim 8, wherein said authenticator is further configured to transmit a return value to the BIOS responsive to successful authentication of the password input.

14. The system according to claim 13, wherein the return value enables access to a hard drive.

15. A non-signal program storage device readable by machine, tangibly embodying a program of instructions executable by the machine to perform acts comprising:
- receiving a power-on password input at a BIOS, said power-on password input not being stored in said BIOS;
- transmitting said power-on password input to a second location for authentication; and
- authenticating the power-on password input at the second location, the second location being different from the BIOS;
- transmitting the power-on password input together with a supplementary component to the second location for authentication;
- transmitting an authorization request to the second location; and
- receiving an output from the second location;
- wherein said authenticating further comprises processing the output from the second location to create the supplementary component.

* * * * *